US012630659B2

(12) United States Patent
Song et al.

(10) Patent No.: US 12,630,659 B2
(45) Date of Patent: *May 19, 2026

(54) RESINS FOR DIGITAL LIGHT PROCESSING 3D PRINTING

(71) Applicant: Toyota Motor Engineering & Manufacturing North America, Inc., Plano, TX (US)

(72) Inventors: Yuyang Song, Ann Arbor, MI (US); Masato Tanaka, Ann Arbor, MI (US); Liang Yue, Atlanta, GA (US); Hang Qi, Marietta, GA (US)

(73) Assignees: Toyota Motor Engineering & Manufacturing North America, Inc., Plano, TX (US); Georgia Tech Research Corporation, Atlanta, GA (US)

( * ) Notice: Subject to any disclaimer, the term of this patent is extended or adjusted under 35 U.S.C. 154(b) by 843 days.

This patent is subject to a terminal disclaimer.

(21) Appl. No.: 17/833,144

(22) Filed: Jun. 6, 2022

(65) Prior Publication Data
US 2023/0391935 A1 Dec. 7, 2023

(51) Int. Cl.
C08F 220/12 (2006.01)
(52) U.S. Cl.
CPC .................................. C08F 220/12 (2013.01)
(58) Field of Classification Search
None
See application file for complete search history.

(56) References Cited

U.S. PATENT DOCUMENTS

| | | | | | |
|---|---|---|---|---|---|
| 6,017,973 A | * | 1/2000 | Tamura | ............. | C08F 222/1065 |
| | | | | | 430/269 |
| 6,586,494 B2 | * | 7/2003 | Mejiritski | ............. | B33Y 70/00 |
| | | | | | 522/90 |
| 7,276,543 B2 | * | 10/2007 | Bishop | .................. | C03C 25/106 |
| | | | | | 522/182 |
| 7,393,623 B2 | * | 7/2008 | Conroy | .................. | G11B 7/252 |
| | | | | | 430/280.1 |
| 7,514,477 B2 | * | 4/2009 | Klare | ..................... | B33Y 70/10 |
| | | | | | 430/269 |

(Continued)

FOREIGN PATENT DOCUMENTS

| | | | | | |
|---|---|---|---|---|---|
| WO | WO-2004027683 A2 | * | 4/2004 | ............. | G11B 23/40 |
| WO | WO-2004031091 A1 | * | 4/2004 | ........... | C03C 25/106 |

OTHER PUBLICATIONS

Kuhnt et al. Poly(caprolactone-co-trimethylenecarbonate) urethane acrylate resins for digital light processing of bioresorbable tissue engineering implants. Biomater. Sci., 2019, 7,4984. (Year: 2019).*

(Continued)

*Primary Examiner* — Sanza L. McClendon
(74) *Attorney, Agent, or Firm* — Christopher G. Darrow; DARROW MUSTAFA PC

(57) ABSTRACT

A resin for grayscale digital light processing 3D printing includes a donor moiety, an acceptor moiety, a rigid moiety, a photoinitiator, and a photoabsorber. The donor moiety is an acrylate monomer with a side group of a free carbonyl, a primary amine on an acrylate, a secondary amine on an acrylate, and/or a tertiary amine on an acrylate. The acceptor moiety is different than the donor moiety and is an acrylate monomer with a side group of a free hydroxy, a primary amine, secondary amine, and/or an imine. And the rigid moiety is acrylate monomer with a side group of a cyclohexyl, a substituted cyclohexyl, or a bicyclic structure. A monolithic structure formed from the resin using grayscale digital light processing 3D printing can have a Young's modulus ranging from 0.1 MPa to 100 MPa.

18 Claims, 13 Drawing Sheets

(56) References Cited

U.S. PATENT DOCUMENTS

| | | | | |
|---|---|---|---|---|
| 7,935,476 | B2 * | 5/2011 | Teng | G03F 7/027 |
| | | | | 101/463.1 |
| 8,664,297 | B2 * | 3/2014 | Fujii | C09D 11/40 |
| | | | | 524/548 |
| 9,827,712 | B2 * | 11/2017 | Snyder | B29C 64/106 |
| 10,245,785 | B2 * | 4/2019 | Adzima | B29C 64/135 |
| 11,174,326 | B2 * | 11/2021 | Scott | C08F 2/50 |
| 11,535,690 | B2 * | 12/2022 | Wang | B29C 64/314 |
| 11,851,511 | B2 * | 12/2023 | Scott | C08F 4/40 |
| 12,173,095 | B2 * | 12/2024 | Scott | C08F 222/10 |
| 2005/0018595 | A1 * | 1/2005 | Conroy | G11B 20/00557 |
| | | | | 264/1.33 |
| 2013/0230701 | A1 * | 9/2013 | Mochizuki | C09D 11/30 |
| | | | | 522/16 |
| 2013/0234370 | A1 * | 9/2013 | Suzuki | B29C 64/40 |
| | | | | 522/79 |
| 2016/0145452 | A1 * | 5/2016 | Fong | C09D 11/30 |
| | | | | 524/521 |
| 2021/0229364 | A1 * | 7/2021 | McLeod | B33Y 50/02 |
| 2022/0106417 | A1 * | 4/2022 | Scott | C08F 222/10 |

OTHER PUBLICATIONS

Voet et al. Biobased Acrylate Photocurable Resin Formulation for Stereolithography 3D Printing. ACS Omega 2018 3 (2), 1403-1408. (Year: 2018).*

Kim et al. Development of fabrics by digital light processing three-dimensional printing technology and using a polyurethane acrylate photopolymer. Textile Research Journal, vol. 90, Issue 7-8, Apr. 2020, pp. 731-968. (Year: 2020).*

Choi et al. Feasible Digital Light Processing Three-Dimensional Printing of a Biodegradable Porous Polymer with a High Internal Phase Emulsion Structure. ACS Applied Polymer Materials. vol. 4, Issue Mar. 3, 11, 2022 pp. 1544-2215 (Year: 2022).*

Deng et al. Urethane acrylate-based photosensitive resin for three-dimensional printing of stereolithographic elastomer. J Appl Polym Sci. 2020; 137:e49294. (Year: 2020).*

Peng et al. 3D Printing Mechanically Robust and Transparent Polyurethane Elastomers for Stretchable Electronic Sensors. Applied Materials & Interfaces 2020 12 (5), 6479-6488 (Year: 2020).*

Kuang et al., "Grayscale digital light processing 3D printing for highly functionally graded materials", Science Advances, vol. 5, No. 5, May 3, 2019. pp. 1-9.

Xue et al., "Digital Light Processing-Based 3D Printing of Cell-Seeding Hydrogel Scaffolds with Regionally Varied Stiffness," ACS Biometer, Sci. Eng. 2019, vol. 5, pp. 4825-4833.

Rashid et al., "Vat Polymerization of Polymers and Polymer Composites: Process and Applications," Additive Manufacturing, vol. 47, Nov. 2021 pp. 1-35.

Roach et al., "4D Printing Based on Multi-Material Design", Manufacturing in the Era of 4th Industrial Revolution, Mar. 2021, pp. 163-194.

Montgomery et al., "Recent Advances in Additive Manufacturing of Active Mechanical Metamaterials", Current Opinion in Solid State and Materials Science, vol. 24, Issue 5, Oct. 2020, pp. 1-45.

* cited by examiner

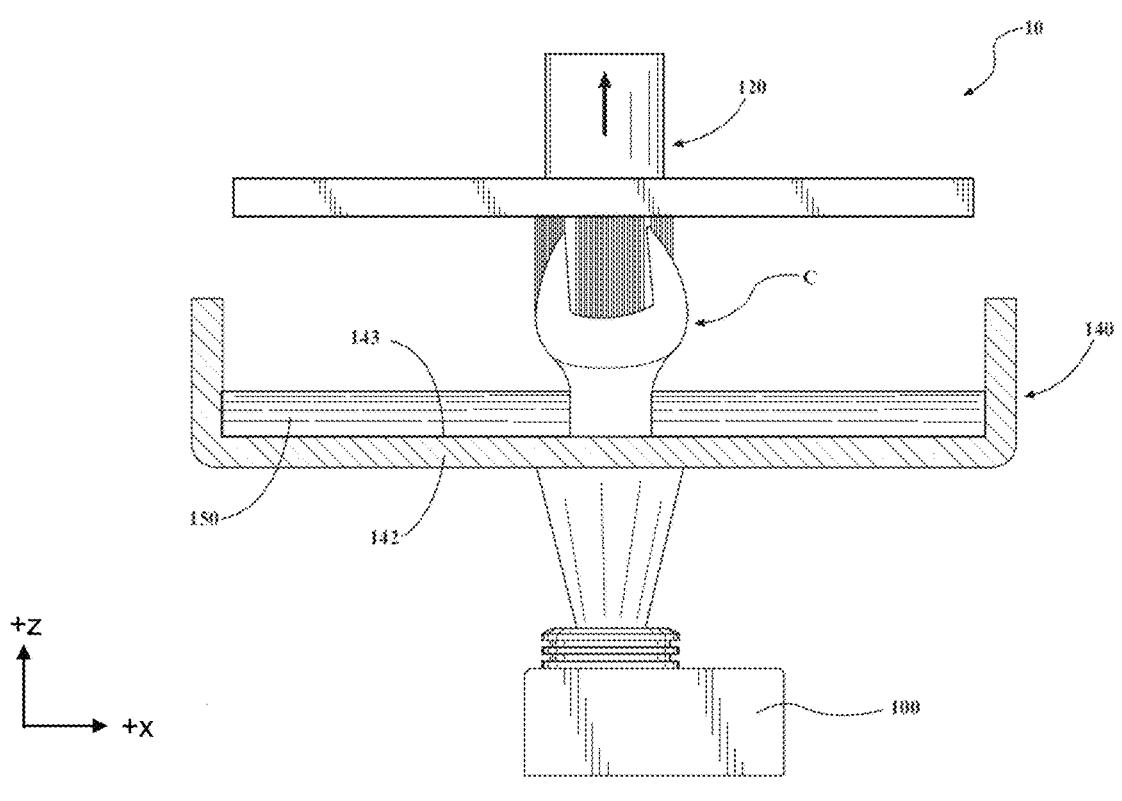
FIG. 1
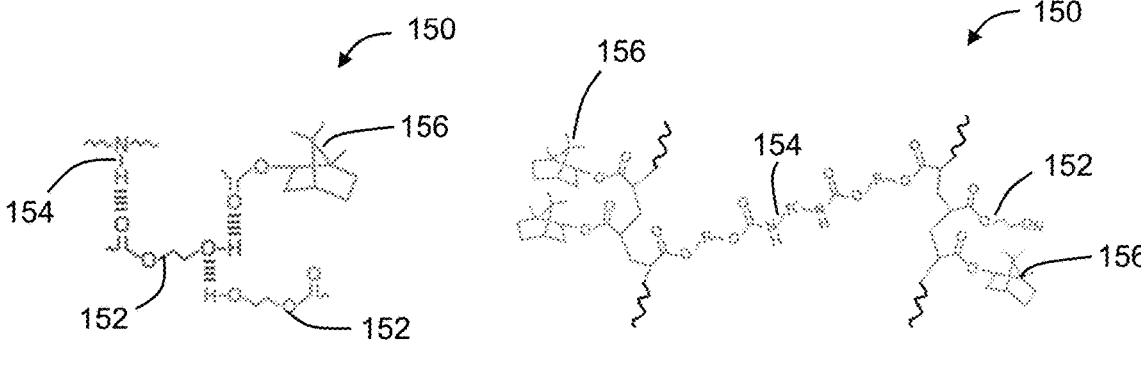
FIG. 2A                    FIG. 2B 1 cm

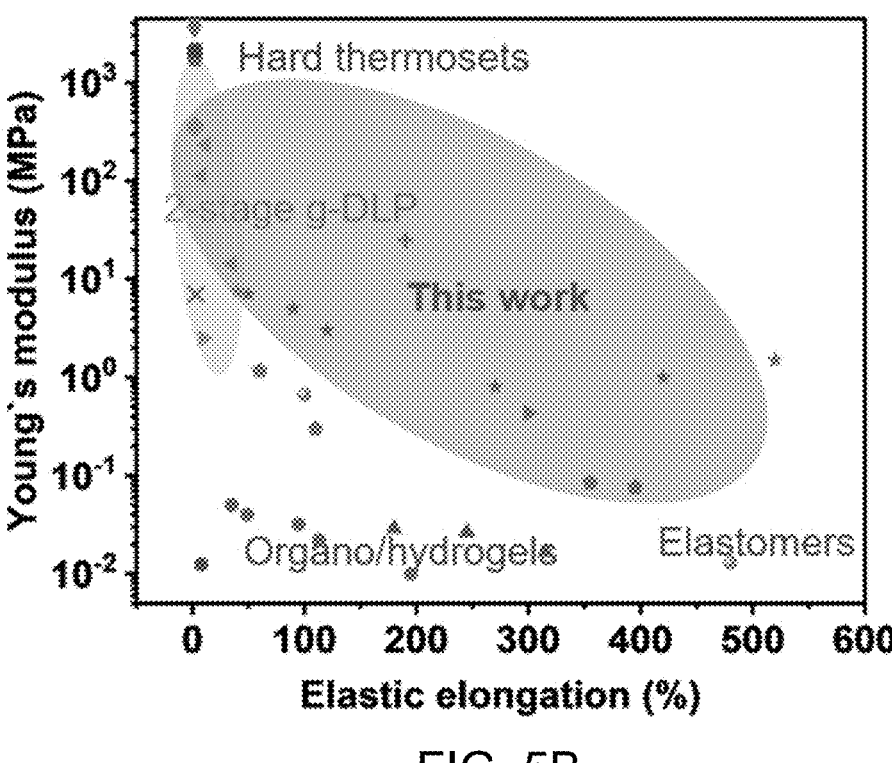
FIG. 5B
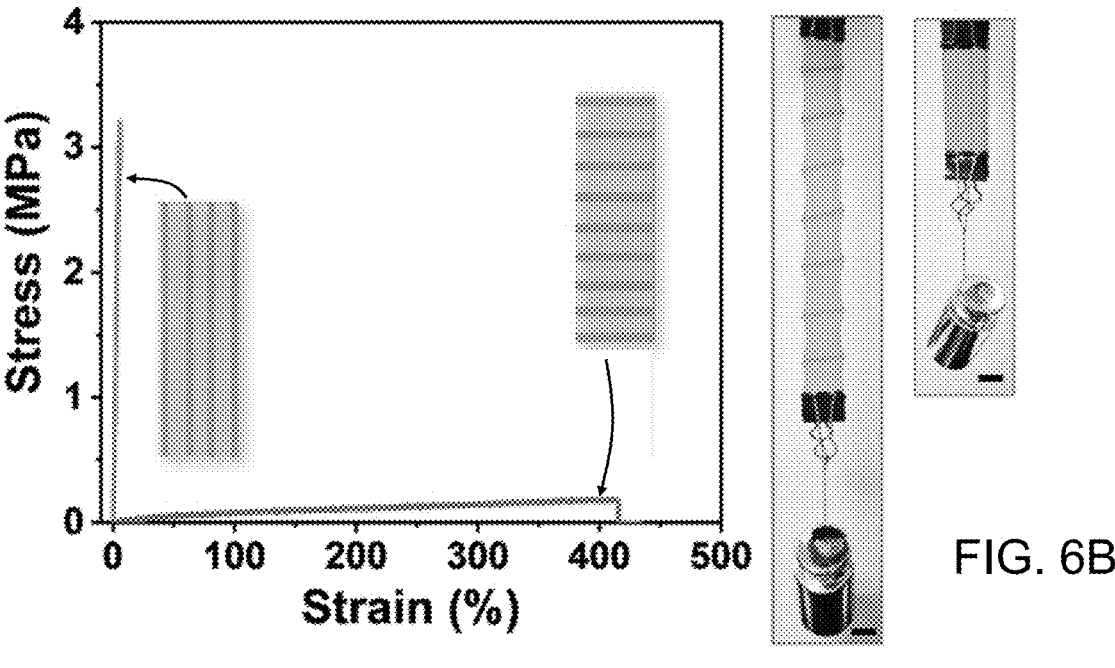
FIG. 6A
FIG. 6B 1 cm

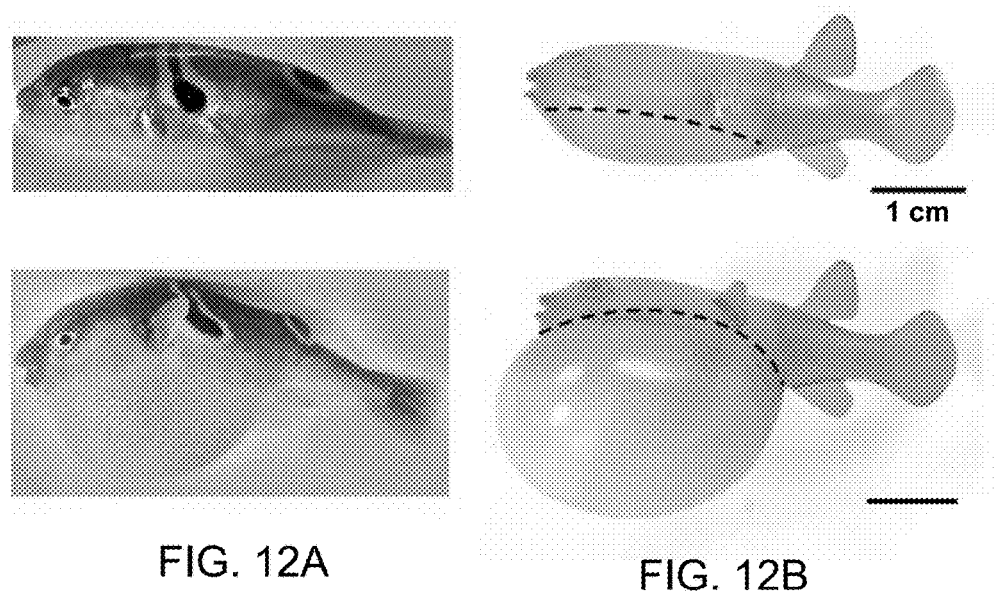
FIG. 12A             FIG. 12B
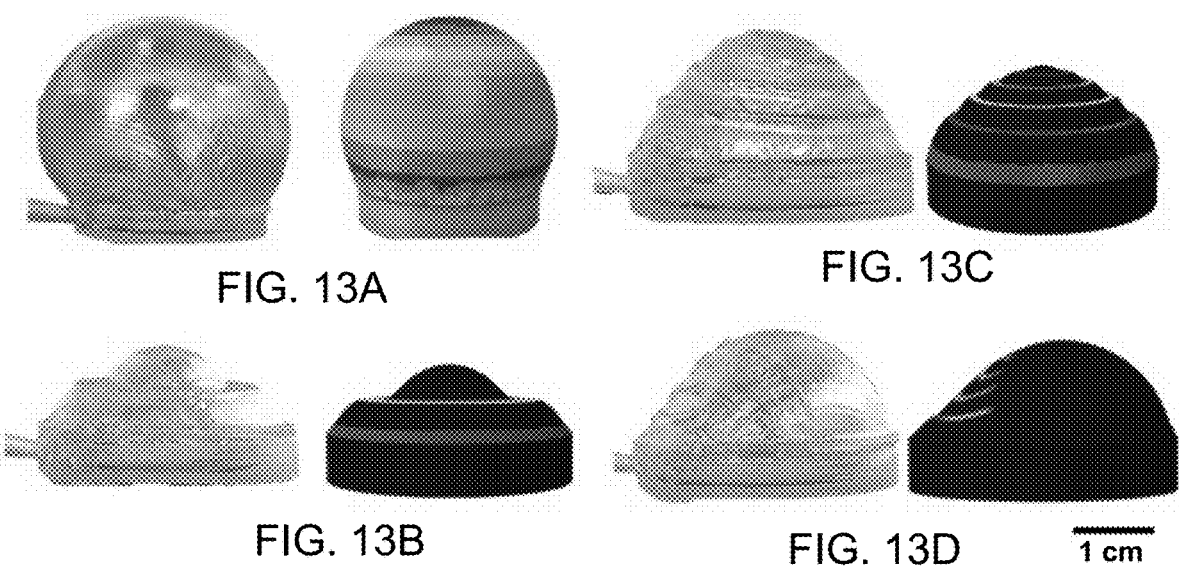
FIG. 13A            FIG. 13C
FIG. 13B            FIG. 13D

FIG. 14A     1 cm

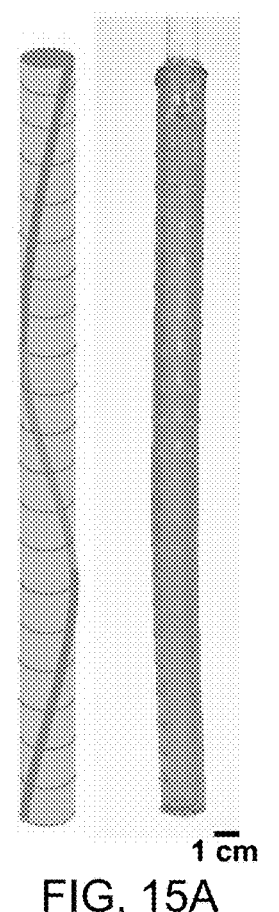
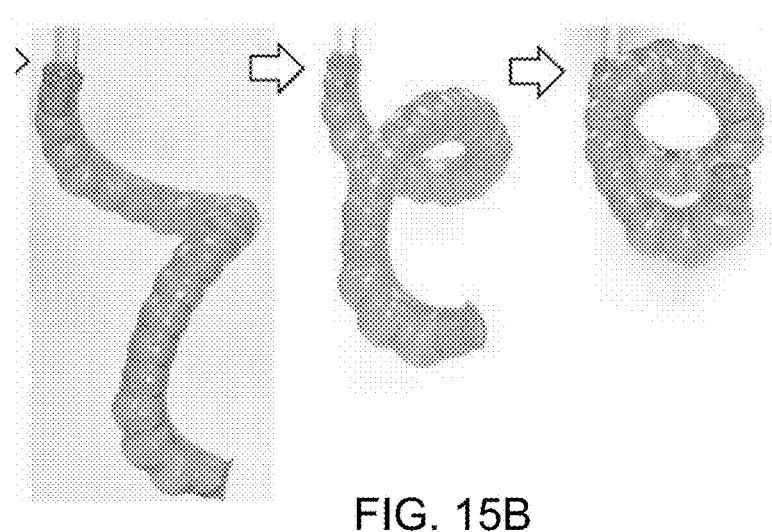
FIG. 15B
1 cm
FIG. 15A
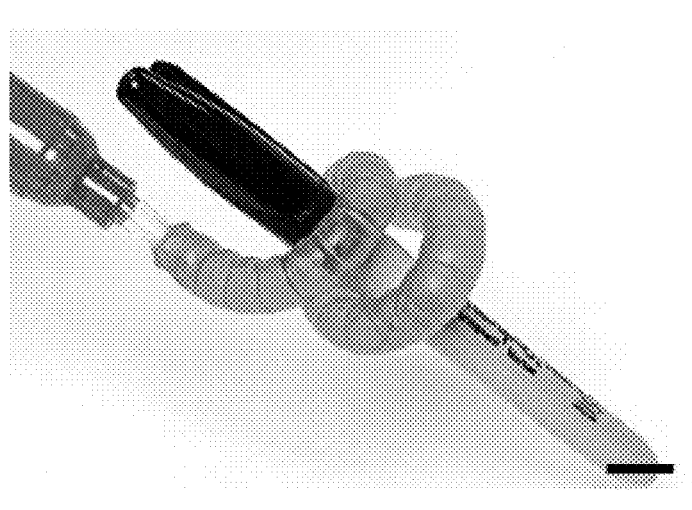
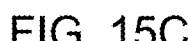
FIG. 15C
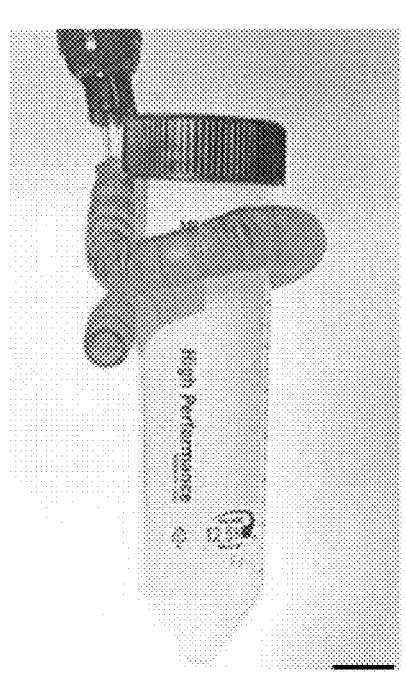
FIG. 15D

RESINS FOR DIGITAL LIGHT PROCESSING 3D PRINTING

TECHNICAL FIELD

The present disclosure generally relates to resins, and particularly to resins for digital light processing 3D printing.

BACKGROUND

Digital light processing three dimensional (DLP 3D) printing is a vat polymerization technique that builds 3D parts by curing layer by layer of resin using a digital light projector. And grayscale DLP 3D (g-DLP 3D) printing employs grayscale light patterns to obtain functionally graded materials. However, current resins provide limited ranges in stiffness and elasticity.

The present disclosure addresses these issues with resins for g-DLP 3D printing, and other issues related to g-DLP 3D printing.

SUMMARY

In one form of the present disclosure, a resin for 3D printing includes a donor moiety, an acceptor moiety, and a rigid moiety. The donor moiety is in the form of an acrylate monomer with a side group comprising at least one of a free carbonyl, a primary amine on an acrylate, a secondary amine on an acrylate, and a tertiary amine on an acrylate. The acceptor moiety is different than the donor moiety and is in the form of an acrylate monomer with a side group comprising at least one of a free hydroxy, a primary amine, secondary amine, and an imine. And the rigid moiety is in the form of an acrylate monomer with a side group comprising of one or more of a cyclohexyl, a substituted cyclohexyl, and a bicyclic structure. Also, the resin includes a photoinitiator, a photoabsorber, and is configured to form a solid polymer using grayscale digital light processing 3D printing and has a Young's modulus ranging from 0.1 MPa to 100 MPa.

In another form of the present disclosure, a resin for 3D printing includes a donor moiety, an acceptor moiety, and a rigid moiety. The donor moiety is selected from the group consisting of 2-hydroxyethyl acrylate, caprolactone acrylate, hydroxypropyl acrylate, 2,3-dihydroxypropyl acrylate, 1,3-dihydroxy propyl acrylate, N-hydroxyethyl acrylamide, and aliphatic urethane-based diacrylate. The acceptor moiety is selected from the group consisting of aliphatic urethane-based diacrylate and 2-hydroxyethyl acrylate. And the rigid moiety is selected from the group consisting of isobornyl acrylate, 4-acryloylmorpholine, methyl methacrylate, 2-hydroxyethyl methacrylate, and isobornyl methacrylate. The resin also includes a photoinitiator, a photoabsorber, and is configured to form a solid polymer with a Young's modulus ranging from 0.1 MPa to 200 MPa using grayscale digital light processing 3D printing.

In still another form of the present disclosure, a resin for 3D printing includes a donor moiety, an acceptor moiety, and a rigid moiety. The donor moiety comprises 2-hydroxyethyl acrylate, the acceptor moiety comprises aliphatic urethane-based diacrylate, and the rigid moiety comprises isobornyl acrylate. The resin also includes a photoinitiator, a photoabsorber, and is configured to form a solid polymer with a Young's modulus ranging from 0.1 MPa to 300 MPa using grayscale digital light processing 3D printing.

These and other features of the composite salt mixture and its preparation will become apparent from the following detailed description when read in conjunction with the figures and examples, which are exemplary, not limiting.

BRIEF DESCRIPTION OF THE DRAWINGS

The present teachings will become more fully understood from the detailed description and the accompanying drawings, wherein:

FIG. 1 illustrates a g-DLP 3D printer;

FIG. 2A illustrates a resin according to the teachings of the present disclosure with hydrogen bonding between a donor moiety, an acceptor moiety, and a rigid moiety;

FIG. 2B illustrates the resin in FIG. 2A with cross-linking between the donor moiety, the acceptor moiety, and the rigid moiety;

FIG. 5B is a plot of Young's modulus versus percent elastic elongation for tensile samples manufactured via g-DLP 3D printing using a resin according to the teachings of the present disclosure and compared to other traditional materials;

FIG. 6A is a plot of stress versus strain for a pair of composite-like structures manufactured with a g-DLP 3D printer using a resin according to the teachings of the present disclosure of the pair of composite-like structures;

FIG. 6B is a pair of photographs for the composite-like structures tested in FIG. 6A being subjected to a 200 gram (g) weight;

FIG. 12A is a pair of photographs of a puffer fish before and after inflation;

FIG. 12B is a pair of photographs of a biomimetic pufferfish manufactured with a g-DLP 3D printer using a resin according to the teachings of the present disclosure before and after inflation;

FIG. 13A is a photograph and an FEA simulation of a membrane structure manufactured with a g-DLP 3D printer using a resin according to the teachings and having a rigid cap and a soft membrane;

FIG. 13B is a photograph and an FEA simulation of a membrane structure manufactured with a g-DLP 3D printer using a resin according to the teachings and having a rigid cap and a single concentric stiff ring in a soft membrane;

FIG. 13C is a photograph and an FEA simulation of a membrane structure manufactured with a g-DLP 3D printer using a resin according to the teachings and having a rigid cap and a four concentric stiff rings in a soft membrane;

FIG. 13D is a photograph and an FEA simulation of a membrane structure manufactured with a g-DLP 3D printer using a resin according to the teachings of the present disclosure and having a rigid cap and a three concentric one-third circle stiff rings in a soft membrane;

FIG. 14A is a schematic drawing of a cylindrical membrane structure with horizontally oriented stiff rings, a photograph of a cylindrical membrane structure with horizontally oriented stiff rings manufactured with a g-DLP 3D printer using a resin according to the teachings of the present disclosure before inflation, and a photograph of the cylindrical membrane structure with horizontally oriented stiff rings after inflation;

FIG. 15A is a schematic drawing of a cylindrical membrane structure with horizontally oriented stiff rings and a vertically oriented helical stiff fiber, and a photograph of a cylindrical membrane structure with horizontally oriented stiff rings and a vertically oriented helical stiff fiber manufactured with a g-DLP 3D printer using a resin according to the teachings of the present disclosure before inflation;

FIG. 15B is a series of photographs of the cylindrical membrane structure with the horizontally oriented stiff rings and the vertically oriented helical stiff fiber in FIG. 15A during inflation and forming a tentacle shape;

FIG. 15C is a photograph of the cylindrical membrane structure with the horizontally oriented stiff rings and the vertically oriented helical stiff fiber in FIG. 15A grasping a marker; and FIG. 15D is a photograph of the cylindrical membrane structure with the horizontally oriented stiff rings and the vertically oriented helical stiff fiber in FIG. 15A grasping a marker.

Figure 3A:
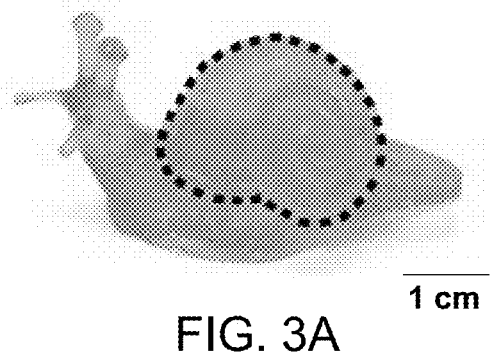
FIG. 3A is a photograph of a snail structure manufactured with a g-DLP 3D printer using a resin according to the teachings of the present disclosure.

It should be noted that the figures set forth herein are intended to exemplify the general characteristics of the composite salt mixtures and electrolytes of the present technology, for the purpose of the description of certain aspects. The figures may not precisely reflect the characteristics of any given aspect and are not necessarily intended to define or limit specific forms or variations within the scope of this technology.

DETAILED DESCRIPTION

The present disclosure provides resins for single-vat single cure g-DLP 3D printing. The resins have a composition that provides highly stretchable soft organogel portions and stiff thermoset portions within a single layer of printing. In addition, the resins provide for the manufacture of a monolithic 3D printed component having one or more stretchable (elastic) soft organogel portions and one or more stiff thermoset portions, without the use or need of multiple vats of different resins.

In some variations, a monolithic structure manufactured with a g-DLP 3D printer using a resin according to the teachings of the present disclosure exhibits Young Moduli ranging from about 10 MPa to about 100 MPa. In at least one variation, a monolithic structure manufactured with a g-DLP 3D printer using a resin according to the teachings of the present disclosure exhibits Young Moduli ranging from about 10 MPa to about 200 MPa. In some variations a monolithic structure manufactured with a g-DLP 3D printer using a resin according to the teachings of the present disclosure exhibits Young Moduli ranging from about 10 MPa to about 300 MPa. And in at least one variation, a monolithic structure manufactured with a g-DLP 3D printer using a resin according to the teachings of the present disclosure exhibits Young Moduli ranging from about 10 MPa to about 400 MPa or from about 10 MPa to about 478 MPa.

In some variations, a monolithic structure manufactured with a g-DLP 3D printer using a resin according to the teachings of the present disclosure exhibits Young Moduli ranging from about 8 MPa to about 100 MPa. In at least one variation, a monolithic structure manufactured with a g-DLP 3D printer using a resin according to the teachings of the present disclosure exhibits Young Moduli ranging from about 5 MPa to about 100 MPa. In some variations a monolithic structure manufactured with a g-DLP 3D printer using a resin according to the teachings of the present disclosure exhibits Young Moduli ranging from about 2 MPa to about 100 MPa. And in at least one variation, a monolithic structure manufactured with a g-DLP 3D printer using a resin according to the teachings of the present disclosure exhibits Young Moduli ranging from about 1 MPa to about 100 MPa or from about 0.5 MPa to about 100 MPa or from about 0.1 MPa to about 100 MPa.

In some variations, a monolithic structure manufactured with a g-DLP 3D printer using a resin according to the teachings of the present disclosure exhibits Young Moduli ranging from about 5 MPa to about 200 MPa. In at least one variation, a monolithic structure manufactured with a g-DLP 3D printer using a resin according to the teachings of the present disclosure exhibits Young Moduli ranging from about 2 MPa to about 200 MPa. In some variations a monolithic structure manufactured with a g-DLP 3D printer using a resin according to the teachings of the present disclosure exhibits Young Moduli ranging from about 1 MPa to about 300 MPa. And in at least one variation, a monolithic structure manufactured with a g-DLP 3D printer using a resin according to the teachings of the present disclosure exhibits Young Moduli ranging from about 0.5 MPa to about 400 MPa or from about 0.1 MPa to about 475 MPa.

In some variations, a monolithic structure manufactured with a g-DLP 3D printer using a resin according to the teachings of the present disclosure exhibits an elastic elongation up to 100%. And in some variations, a monolithic structure manufactured with a g-DLP 3D printer using a resin according to the teachings of the present disclosure exhibits an elastic elongation up to 200%, up to 300%, up to 400%, up to 450%, or over 450%. Stated differently, a monolithic structure manufactured via g-DLP 3D printing using a resin according to the teachings of the present disclosure has at least one portion with low stiffness and high elasticity and at least one portion with high stiffness and high strength as described in greater detail below.

It should be understood that 3D printing allows for the fabrication of components and structures with geometric and material complexities beyond what is physically and/or economically possible with traditional manufacturing techniques such as casting, machining, cold working, hot working, among others. And new 3D printing capabilities have demonstrated use in functional applications or structures such as deployable structures, soft robotics, flexible electrical components, and biomimetic designs. However, many functional applications such as nature-like structures, airless tires, multi-stable absorbers, and 4D printing require the use of materials with vastly different properties. That is, such structures have or require different portions with very different mechanical and/or physical properties.

It should also be understood that DLP 3D printing is a high-speed and high-resolution printing method that has become increasingly popular in recent years. Digital light processing uses a projector to irradiate hundreds or thousands of thin layers of resin having predefined cross-sections of a solid part such that each thin layer is cured and the solid part is manufactured layer-by-layer. In a typical DLP printing process, a single resin vat is used, only z-direction motion of a build plate is needed to form a component, and photopolymerization (or photocuring) of the thin layers occurs in a few seconds. Accordingly, DLP 3D printing is one of the fastest 3D printing technologies. However, the use of a single resin vat makes DLP in general, not suitable for printing parts with multiple material properties. Methods using multiple vats have been developed to print two or more materials by transferring a printed part between multiple vats. However, cross-contamination between multiple vats, switching between different resin vats and cleaning significantly slows down the printing speed.

In g-DLP printing, the local degree of monomer conversion (curing) is controlled by light intensity, which is manipulated at pixel level by an input grayscale image. For example, and with reference to FIG. 1, a g-DLP 3D printer 10 with a projector 100, build platform 120, and a single resin vat 140 containing a resin 150 according to the teachings of the present disclosure is shown. The projector 100 is configured to project a grayscale image onto a transparent bottom wall 142 of the single resin vat 140 such that a layer of the resin 150 having a predefined cross-section of a component 'C' is illuminated and cured. After the layer of the resin 150 is illuminated (and cured) via the grayscale exposure from the projector 100, the build platform 120 moves in the +z-direction shown in the figure and the resin 150 flows into or between the mostly cured layer of resin and an upper surface 143 of the transparent bottom wall 142. Then, the projector 100 projects another grayscale image onto the transparent bottom wall 142 of the single resin vat 140 such that the most recent layer of the resin 150 is illuminated with another predefined cross-section of the component 'C'. The process or cycle continues until manufacture of the component C, layer-by-layer, is complete.

Referring to FIGS. 2A-2B, one non-limiting example of three monomers included in the resin 150 is shown. Particularly, the resin 150 includes at least one hydrogen bond donating monomer 152 (2-hydroxyethyl acrylate shown in the figures), at least one hydrogen bond accepting monomer 154 (aliphatic urethane-based diacrylate shown in the figures), and at least one rigid monomer 156 (isobornyl acrylate shown in the figures). In some variations, the at least one hydrogen bond donating monomer 152 can also be a hydrogen bond accepting monomer that is different from the at least one hydrogen bond accepting monomer 154 and/or the at least one hydrogen bond accepting monomer 154 can also be a hydrogen bond donating monomer from is different than the at least one hydrogen bond donating monomer 152.

In some variations, the at least one hydrogen bond donating monomer 152 (also referred to herein as "donator moiety 152") is an acrylate monomer with one or more side groups that include a free carbonyl (—C=O) group or primary, secondary, or tertiary amine side group on an acrylate. And in at least one variation, the at least one hydrogen bond accepting monomer 154 (also referred to herein as "acceptor moiety 154") is an acrylate monomer with one or more side groups that include a free hydroxy (—OH), a primary or secondary amine (—N(H)—, e.g., a urethane (C(O)—N (H)—), or an imine (—N=). And the at least one rigid monomer 156 (also referred to herein as "rigid moiety 156") can be an acrylate monomer with one or more side groups that include one or more of cyclohexyls, substituted cyclohexyls, bicyclic side groups such as isobornyl, norbornyl, and dicylcopentanyl, among others. In addition, the donator moiety 152 and/or the acceptor moiety 154 is an oligomer (e.g., aliphatic urethane-based diacrylate) that functions as a crosslinker.

Non limiting examples of the at least one hydrogen bond donating monomer 152 include 2-hydroxyethyl acrylate (2-HEA), caprolactone acrylate, hydroxypropyl acrylate, 2,3-dihydroxypropyl acrylate, 1,3-dihydroxypropyl acrylate, N-hydroxyethyl acrylamide, and aliphatic urethane-based diacrylate. Non-limiting examples of the at least one hydrogen bond acceptor monomer 154 include aliphatic urethane-based diacrylate (AUD) and 2-HEA. And non-limiting examples of the at least one rigid monomer 156 include isobornyl acrylate (IOBA), 4-acryloylmorpholine, methyl methacrylate, 2-hydroxyethyl methacrylate, and isobornyl methacrylate.

In some variations, resins according to the teachings of the present disclosure (also referred to herein simply as "resin 150") include between about 5 weight percent (wt %) and about 35 wt % of the at least one hydrogen bond donator monomer 152, and in at least one variation the resin 150 includes between about 10 wt % and about 30 wt % of the least one hydrogen bond donator monomer 152. And in some variations, the resin 150 includes between about 15 wt % and about 25 wt % of the least one hydrogen bond donator monomer 152. For example, in at least one variation the resin 150 includes about 20 wt % of the least one hydrogen bond donator monomer 152.

In some variations the resin 150 includes between about 5 wt % and about 35 wt % of the at least one hydrogen bond acceptor monomer 154, and in at least one variation the resin 150 includes between about 10 wt % and about 30 wt % of the at least one hydrogen bond acceptor monomer 154. And in some variations, the resin 150 includes between about wt % and about 25 wt % of the at least one hydrogen bond acceptor monomer 154. For example, in at least one variation the resin 150 includes about 20 wt % of the at least one hydrogen bond acceptor monomer 154.

In some variations the resin 150 includes between about 45 wt % and about 75 wt % of the at least one rigid monomer 156, and in at least one variation the resin 150 includes between about 50 wt % and about 70 wt % of the at least one rigid monomer 156. And in some variations, the resin 150 includes between about 55 wt % and about 65 wt % of the at least one rigid monomer 156. For example, in at least one variation the resin 150 includes about 60 wt % of the at least one rigid monomer 156.

In some variations, the resin 150 includes a photoinitiator. For example, in some variations the resin includes between about 0.1 wt % and about 2 wt % of the photoinitiator, for example between about 0.4 wt % and 1.6 wt % of the photoinitiator or between about 0.7 wt % and about 1.3 wt % of the photoinitiator. In at least one variation the resin 150 includes about 1.0 wt % of the photoinitiator. Non-limiting examples of the photoinitiator include photoinitiator 819 (phenylbis(2,4,6-trimethylbenzoyl)phosphine oxide) and camphorquinone.

In some variations, the resin 150 includes a photoabsorber. For example, in some variations the resin includes between about 0.01 wt % and about 1 wt % of the photoabsorber, for example between about 0.025 wt % and 0.5 wt % of the photoabsorber or between about 0.04 wt % and about 0.1 wt % of the photoabsorber. In at least one variation the resin 150 includes about 0.05 wt % of the photoabsorber. Non-limiting examples of the photoabsorber include methylene, coccine, and tartrazine.

In an effort to better describe the resin 150, its properties, and its capabilities for manufacturing monolithic structures with a range of properties, and yet not to limit the scope of the present disclosure in any manner, one example composition of the resin 150 and numerous examples of monolithic structures and corresponding properties are discussed below.

The resin 150 was prepared by mixing monomers of 2-hydroxyethyl acrylate (Sigma-Aldrich, MO, USA), isobornyl acrylate (Sigma-Aldrich), and AUD (Ebecryl 8413, Allnex, GA, USA) with a weight ratio of 20:60:20. Then, 1 wt % photoinitiator (Irgacure 819, Sigma-Aldrich) and 0.05 wt % photo absorber (Sudan I, Sigma Aldrich) were added to the mixture of monomers.

Not being bound by theory, the IBOA and 2-HEA were included as linear chain builders and AUD as a crosslinker. The AUD is a viscous oligomer with high molecular weight aliphatic chains and urethane units, and forms H—N . . . O hydrogen bonds when interacting with 2-HEA and IBOA monomers. Also, the 2-HEA provides abundant —OH groups that form additional O—H . . . O hydrogen bonds.

At a low degree of curing (also known as "degree of cure" and referred to herein as "DoC"), the covalent network with the prevalent hydrogen bonds of the cured resin provides high stretchability in a rubbery state as illustrated in FIG. 2A, while at high DoC, the stiff IBOA exhibits a glass transition temperature (T g) above room temperature as illustrated in FIG. 2B, thereby yielding glassy behaviors with high modulus.

Figure 3B:
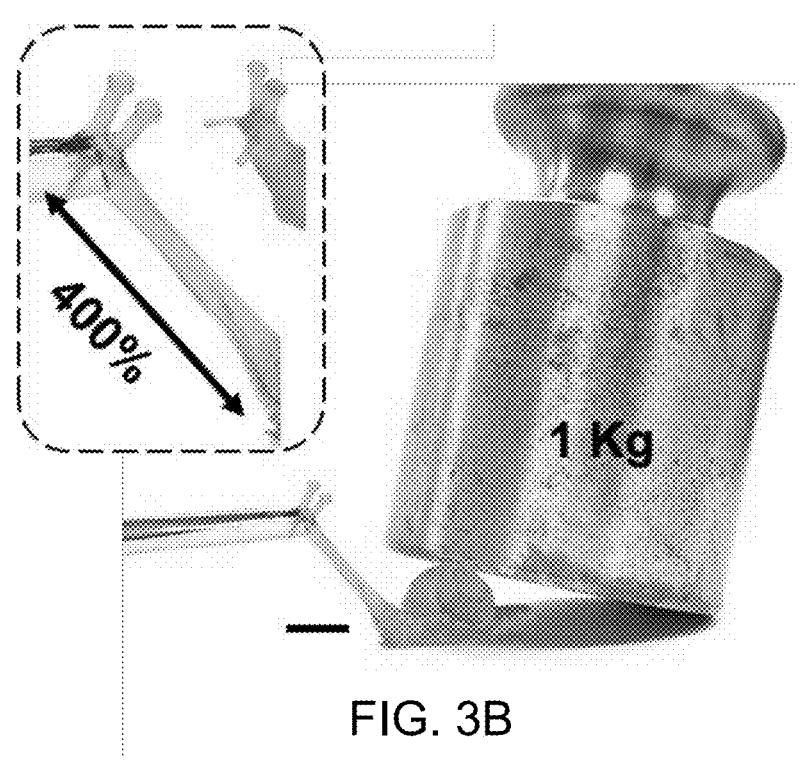
FIG. 3B is a photograph of the snail structure in FIG. 3A with a first soft portion (neck) elongated or stretched 400% and a second soft portion (shell) subjected to a load and maintaining its shape.

Referring to FIGS. 3A-3B, the resin 150 was used in a bottom-up DLP printer where light was projected from the bottom of the vat. The bottom-up DLP printer employed a 385 nm UV-LED light projector (PRO4500, Wintech Digital Systems Technology Corp., Carlsbad, CA, USA) and a linear translation stage (LTS150 Thorlabs, Newton, NJ, USA). A container with an oxygen-permeable window (Teflon AF-2400, Biogeneral Inc., CA, USA) was used as the resin vat.

The designed 3D structures were sliced into image files with a thickness of mm and then converted into grayscale image files with a MATLAB script. The continuous liquid interface production (CLIP) approach was utilized at the optimized speed of 3 s/layer to print the designed 3D structures. The light intensity of the printer was calibrated with a photometer (ILT1400-A Radiometer, International Light Technologies Inc., MA, USA) before printing.

Uniaxial tension tests were performed with a universal test machine (Insight MTS Systems Corp., Eden Prairie, MN, USA) with a cross-head speed of 5 mm/min. Dynamic thermomechanical properties were conducted on a DMA machine (Q800, TA Instruments, New Castle, DE, USA) with a temperature ramped at a rate of 10° C./min. The degree of curing was determined using normalized FTIR (Nicolet iS50 spectrometer, Thermo Fisher Scientific, Waltham, MA, USA) peak intensity of the acrylate group present at 809 cm$^{-1}$. Multiple tests were conducted for each sample to guarantee reproducibility.

Referring to FIG. 3A, a designed snail 3D structure was first sliced into 2D images and then processed into grayscale images using a MATLAB script (MathWorks, Natick, MA, USA). The grayscale images were projected onto the ink-vat window from the bottom (+z direction, FIG. 1), initiating free radical polymerization of the resin and the locally modulated UV intensity resulted in different DoCs, and thereby different mechanical properties, throughout the fabricated part. As shown in FIG. 3B, the printed snail possessed a stiff shell (using 100% light intensity) and soft body (using 40% light intensity). The shell withstood a 1 kg weight without visible deformation while the body (e.g., the neck) was easily stretched by 400%.

It should be understood that the different material properties were defined by the grayscale level of the UV projection, which varied from 0% (full intensity, labeled as G0) to 100% (full dark, labeled as G100). The photopolymerization kinetics were studied with a photopolymerization (PP) model as disclosed by Vitale et al., "Interfacial Profile and Propagation of Frontal Photopolymerization Waves" *Macromolecules* 2015, 48 (1), 198-205, in order to analyze the correlation of depth-dependent DoC with light dose. Based on a slicing thickness of 50 $\mu$m, and using the theoretically predicted correlation from the PP model and experimental trials, a grayscale range from G0 level to G70 (70% darkness) was used to ensure a rapid printing speed and a good shape fidelity. At G0, the light intensity was 24.82 mW/cm$^2$ and the DoC was 96% (determined by FTIR measurement) and at G70, the light intensity was 0.85 mW/cm$^2$, and the DoC was 55%.

Figure 4A:
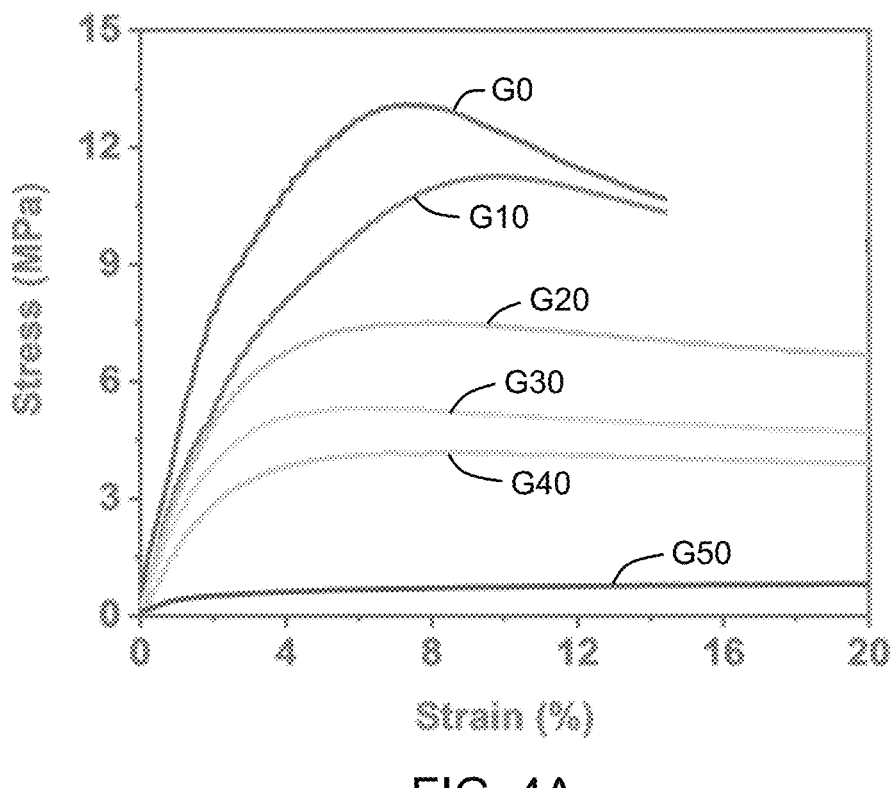
FIG. 4A is a plot of stress versus strain for tensile test samples manufactured with a g-DLP 3D printer using a resin according to the teachings of the present disclosure and printed at a 0% grayscale level (labeled "G0"), a 10% grayscale level (labeled "G10"), a 20% grayscale level (labeled "G20"), a 30% grayscale level (labeled "G30"), a 40% grayscale level (labeled "G40"), and a 50% grayscale level (labeled "G50")
Figure 4B:
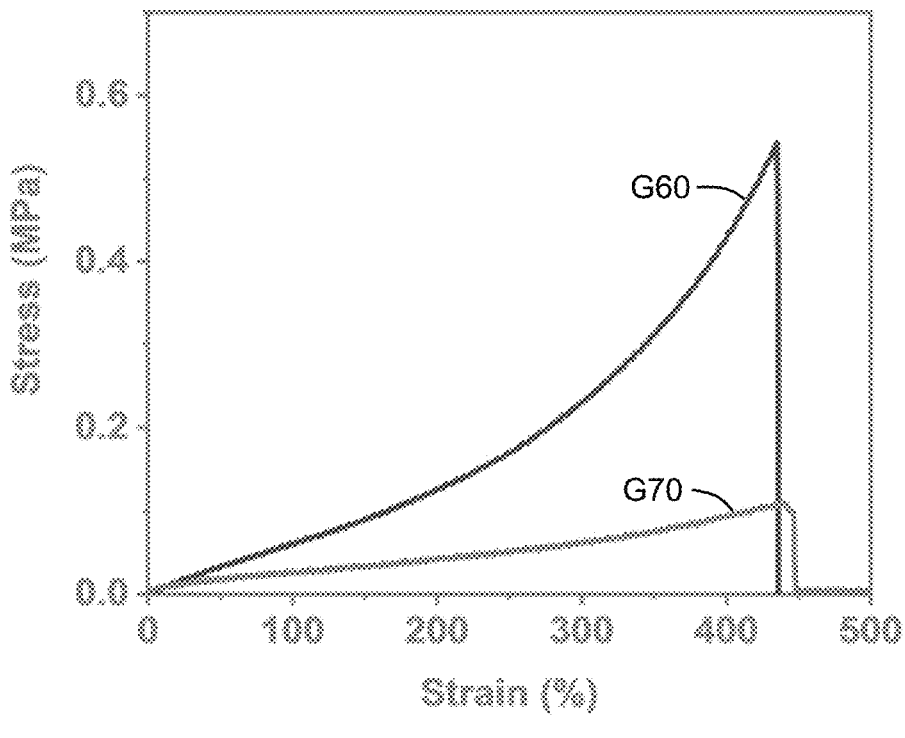
FIG. 4B is a plot of stress versus strain for tensile samples manufactured with a g-DLP 3D printer using a resin according to the teachings of the present disclosure and printed at a 60% grayscale level (labeled "G60") and a 70% grayscale level (labeled "G70")
Figure 4C:
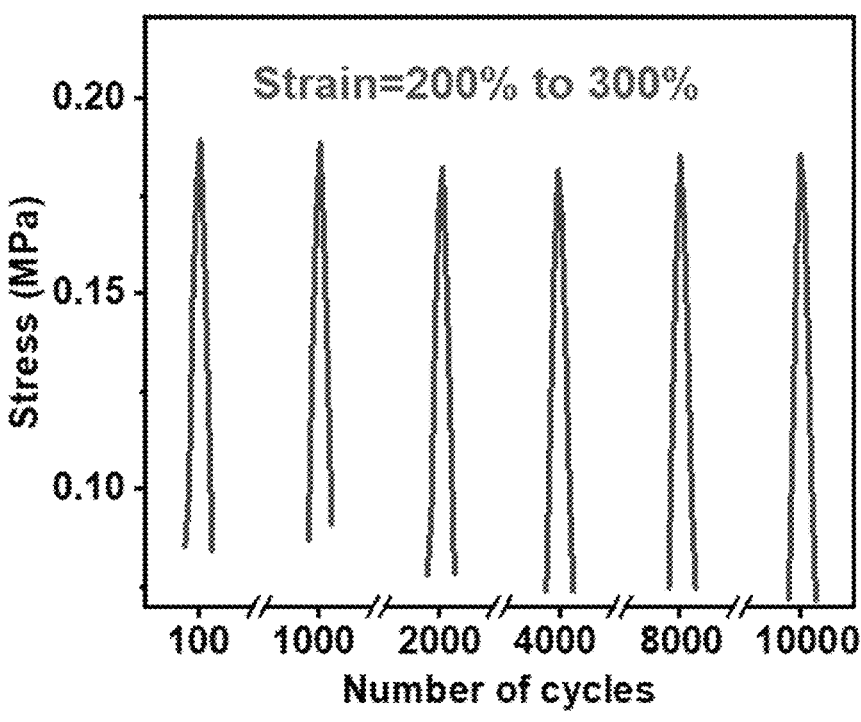
FIG. 4C is a plot of stress versus number of cycles for a "G60" tensile sample manufactured with a g-DLP 3D printing using a resin according to the teachings of the present disclosure and subjected to cycles of strain between 200% and 300%.

The mechanical properties for structures formed from the resin 150 using the g-DLP 3D printer and printed with the different grayscale levels were evaluated with uniaxial tensile tests, and the thermomechanical properties were determined. As shown in FIG. 4A-4B, the printed polymer gradually became softer from G0 down to G50, with a Young's modulus of 487 MPa at G0. This "stiff state" (G0) showed superior toughness also, which was around 109 J/m$^3$. The fracture toughness was also measured with a tearing test and ranged from 650 to 10000 J/m$^2$. The rubbery state G60 and G70 (FIG. 4B) with a conversion around 50~60% possessed a modulus of 0.38 MPa and 0.1 MPa, respectively, and could be stretched up to about 450%. The extensive presence of hydrogen bonding between the uncured monomers with the crosslinked network made the printed part in a stable organogel state that exhibited excellent elastic properties and resilience even after 10,000 fatigue cycles with high strain between 200% and 300% (FIG. 4C).

Figure 5A:
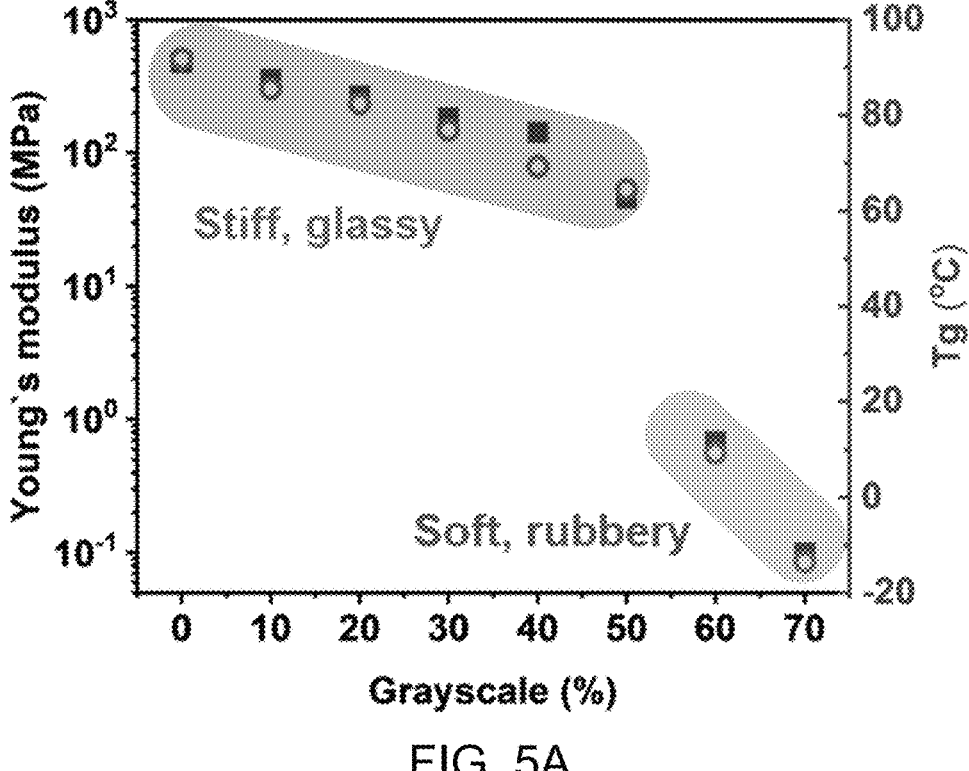
FIG. 5A is a plot of Young's modulus and glass transition temperature versus percent grayscale for tensile samples made from traditional materials and tensile samples manufactured with a g-DLP 3D printer using a resin according to the teachings of the present disclosure and printed at G0, G10, G20, G30, G40, G50, G60, G70 grayscale levels.

The stiff monomer IOBA increased the Tg at high DoC and made the network stiff, which ensured the modulus contrast at different DoC. FIG. 5A summarizes the Young's moduli and $T_g$s at different grayscales, showing a Young's modulus contrast between stiff G0 and soft G70 more than 4800 times. Also, FIG. 5B shows a comparison of the Young's modulus versus elongation for monolithic structures formed from the resin 150 and DLP materials reported in the literature. As shown in FIG. 5B, the resin 150 provides a range of Young's modulus and elastic elongation greater than any known material reported in the literature. Accordingly, the experimental results illustrate that using monomers that form a cured network chain through hydrogen bonding provide high stretchability at low DoC.

Figure 6C:
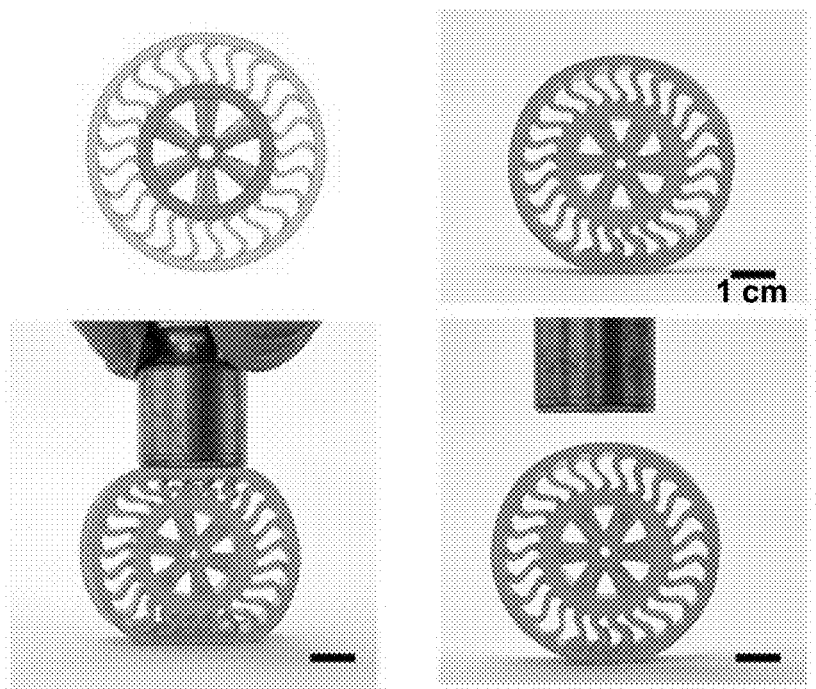
FIG. 6C is a series of photographs of an airless tire manufactured with a g-DLP 3D printer using a resin according to the teachings of the present disclosure.

Referring to FIGS. 6A-6C, g-LPD 3D printed structures formed with the resin 150 that exhibited composite-like properties are shown. Particularly, FIGS. 6A-6B show two printed monolithic composite structures, one with vertical G0 stiff fibers embedded in a flexible G60 matrix and one with horizontal G0 stiff fibers embedded in a flexible G60 matrix. The structure with the horizontal G0 stiff fibers was too soft to hold its own weight (about 1 g) and a 200 g weight stretched the composite more than two times its length. In contrast, the structure with the vertical G0 stiff fibers held the same 200 g weight without observable deformation. Also, FIG. 6C shows prototyping of an airless tire with a compressible G60 rubbery outer circumference for shock-absorbing and a rigid G0 inner hub structure. Such an integrated structure allows the tire to deform when a force is applied in the vertical direction (mimicking a bump on the ground) and to return completely to its original state after the force is removed.

Figure 7A:
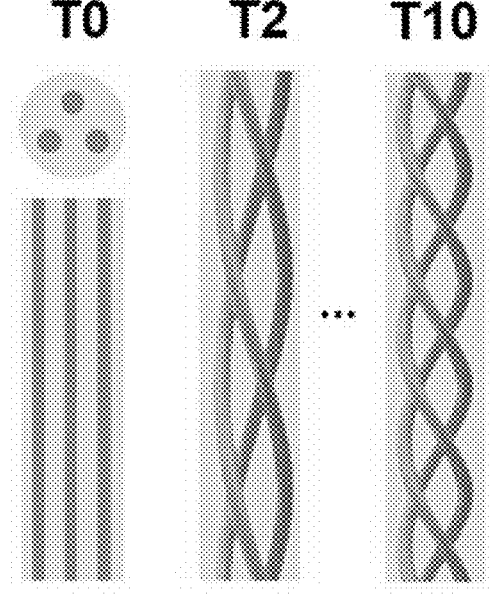
FIG. 7A illustrates schematic drawings of three different mimic artery tissues.
Figure 7B:
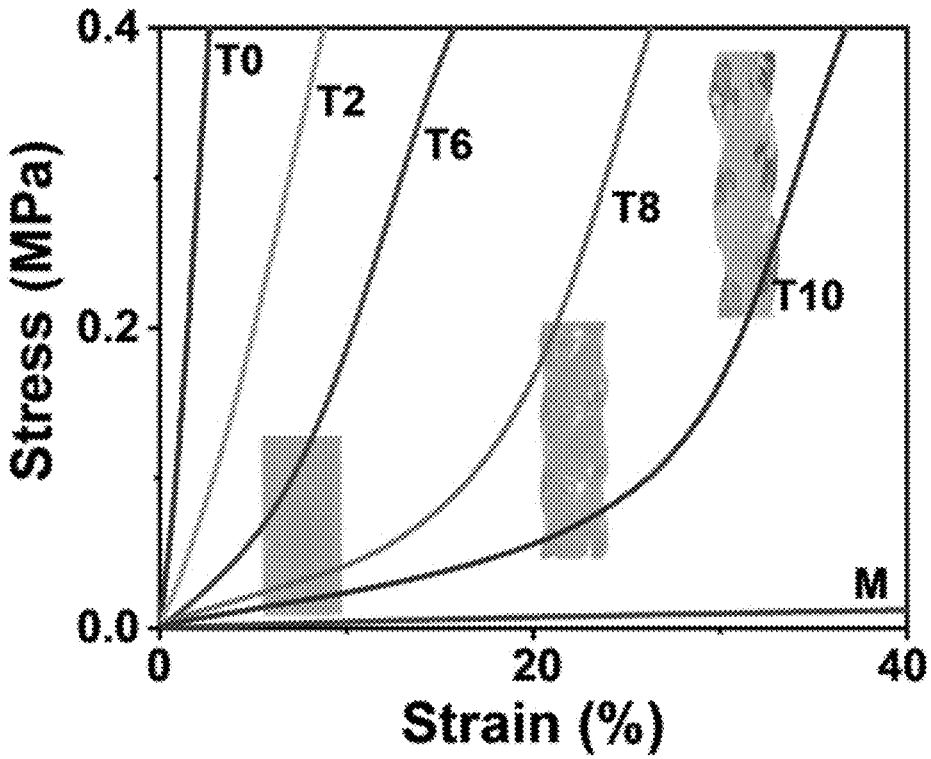
FIG. 7B is a plot of stress versus strain for three mimic artery tissues manufactured with a g-DLP 3D printer using a resin according to the teachings of the present disclosure and subjected to tensile testing.

Referring to FIGS. 7A-7B, designed composites that mimic artery tissues with J-shaped curve stress-strain behaviors are shown. Such a J-shape curve can be important for the functions of artery tissues in regulating the blood flow with a low pressure (or mechanical load) expanding the artery and allowing increased blood flow, but with expansion beyond a certain limit, the artery tissue stiffens to restrict the amount of flow. This behavior is due to the structure of an artery tissue, whose main structural components include a soft elastin matrix embedded with stiff and tortuous collagen fibers. At low stretch of the tissue, the tortuous collagen fibers provide little deformation resistance (due to bending), until they are straightened and become axially stretched at large tissue stretch ratio.

In the composite structures shown in FIG. 7A, the structure of artery tissue is mimicked by g-DLP 3D printing hollow cylindrical structures with a G60 soft elastic matrix and embedded with G0 stiff fibers using the resin 150. Particularly, schematic drawings of a cylindrical sample with straight G0 stiff fibers (labeled T0), a cylindrical sample with helical G0 stiff fibers having a first pitch (labeled T2), and a cylindrical sample with helical G0 stiff fibers having a second pitch (labeled T10) greater than the first pitch are shown in FIG. 7A. The T0, T2, T10 composite samples, plus composite samples corresponding to pitches of T6 and T8, and a sample without any fibers (labeled M), were manufactured with the g-DLP 3D printer using the resin 150 and subjected to uniaxial tensile tests. And as shown in FIG. 7B, the T8 and T10 structures exhibited the J-shape behavior, i.e., an initial low stiffness with a gradual increase until high stiffness is reached and which corresponds to straightening of the stiff fibers. Adjusting the pitch size of fibers (equivalent to tortuosity) thus tunes the strain range for fiber straightening, with the T10 structure showing the most obvious J-shape behavior. Accordingly, these results indicate that g-DLP 3D printing with the resin 150 can be used for pr ototyping artificial tissues that mimic real tissue behaviors.

Figure 8A:
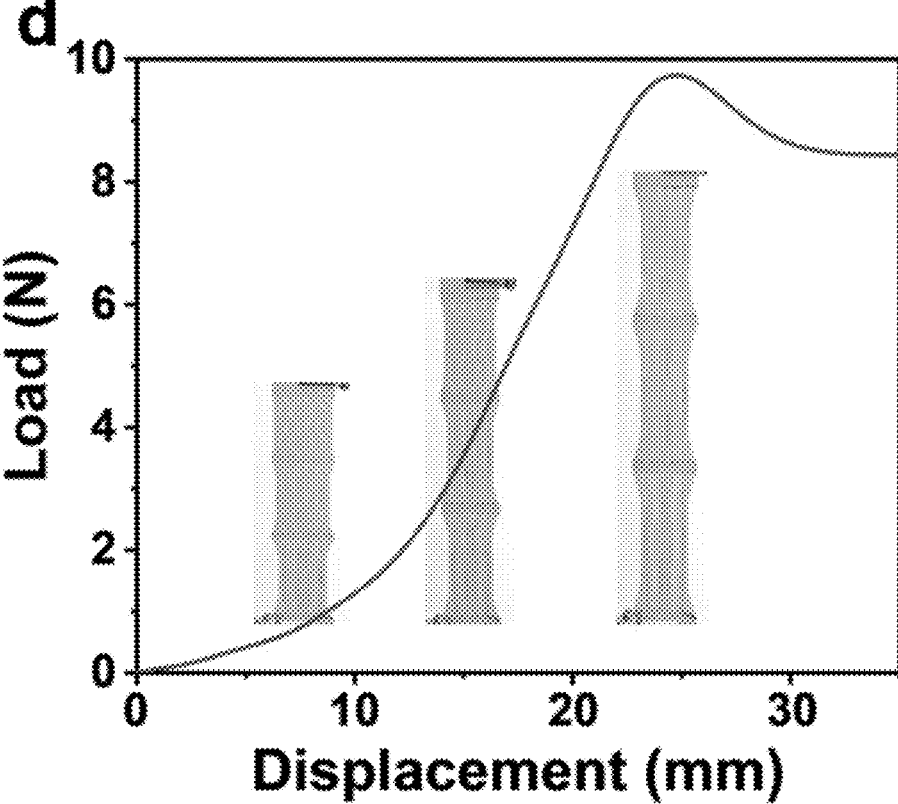
FIG. 8A is a plot of load versus displacement for a three-section structure manufactured with a g-DLP 3D printer using a resin according to the teachings of the present disclosure, the three-section structure having a spring shaped G0 stiff fibers embedded in a first section with a G66 matrix, a second section with a G56 matrix, and a third section with a G46 matrix.
Figure 8B:
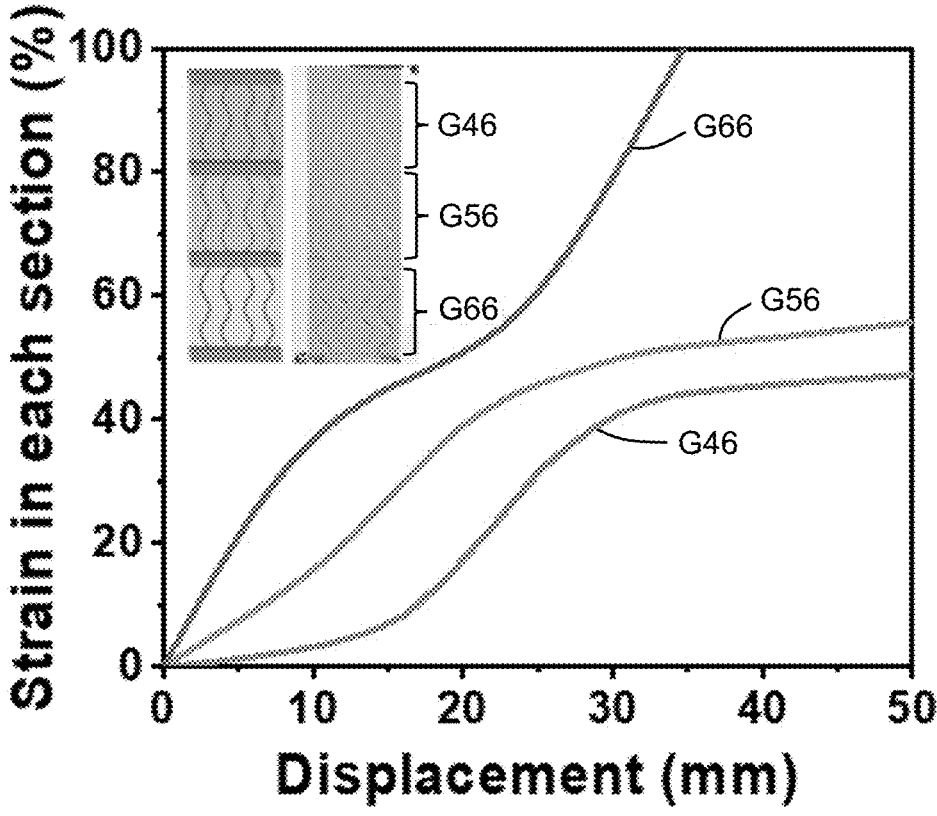
FIG. 8B is a plot of strain for each section of the three-section structure in FIG. 8A versus overall displacement of the three-section structure.

Referring to FIGS. 8A-8B, use of multiple grayscale levels during g-DLP 3D printing of the resin 150 to achieve sequential deformation responses under increasing force levels is shown. Particularly, the sample shown in FIG. 8A had spring-shape stiff fibers (G0) embedded in three sections of a rubbery matrix. The lowest section of the sample had a G66 matrix, the middle section had a G56 matrix, and the upper section had a G46 matrix. And as observed by the three sample images in FIG. 8A, a clear time delay of deformation for each section was observed with the upper G46 section being the stiffest and showing deformation at a later stage. Also, FIG. 8B shows overall strain change of the entire structure as a function of load.

Figure 9:
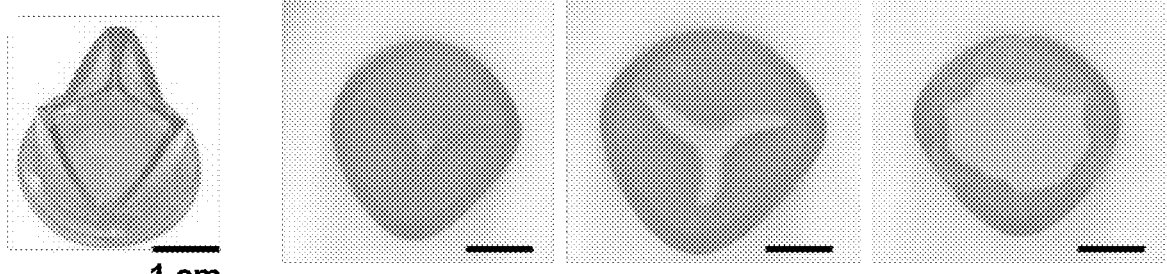
FIG. 9 is a series of photographs of an artificial human heart valve manufactured with a g-DLP 3D printer using a resin according to the teachings of the present disclosure.

Referring to FIG. 9, a biometric structure in the form of an artificial human heart valve having soft and hard portions manufactured with the g-DLP 3D printer using the resin 150 is shown. The heart valve had a G60 rigid support with three G60 soft valve flaps and the valves moved between closed and opened positions under different fluid flow conditions. The hydrodynamic performance of the g-DLP printed heart valves was tested using a pressure loading on the inside face of the flaps and FEA simulation results matched well with experiments. Accordingly, the resin 150 provides an efficient approach to fabricating patient-specific heart valve models for pre-surgical planning.

Figure 10:
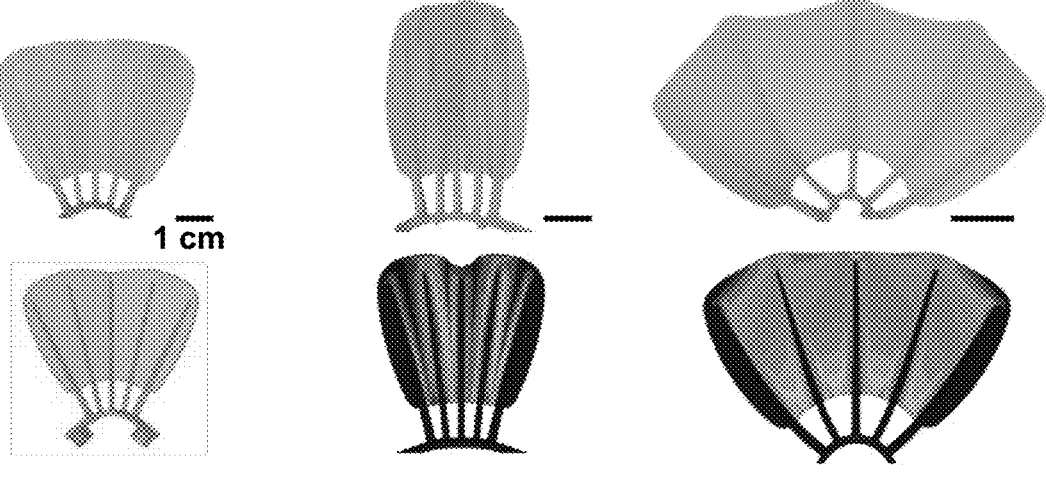
FIG. 10 is a series of photographs and FEA simulations of a fish fin structure manufactured with a g-DLP 3D printer using a resin according to the teachings of the present disclosure.

Referring to FIG. 10, photographs of fish fin structure manufactured with the g-DLP printer using the resin 150 and having G0 stiff bony rays attached to a common G0 fin base and held by a G60 flexible tissue membrane are shown. Fish can change the shape of their fins by pushing or pulling the base of the bony rays by muscles and tendons and the printed model shown in FIG. 10 mimics this shape change. The fish fin actuation was modeled by FEA using a pressure load normal to the base to cause the opening and closing, and out of plane bending of the membrane at folding state and in plane bending of the bony rays at expanding state were well matched with the experimental results. Accordingly, the resin 150 provides g-DLP 3D printing of fish fin structures and accurately replicates such a mechanism, facilitating rapid biomimetic soft robotic structure fabrication.

Figures 11A, 11B:
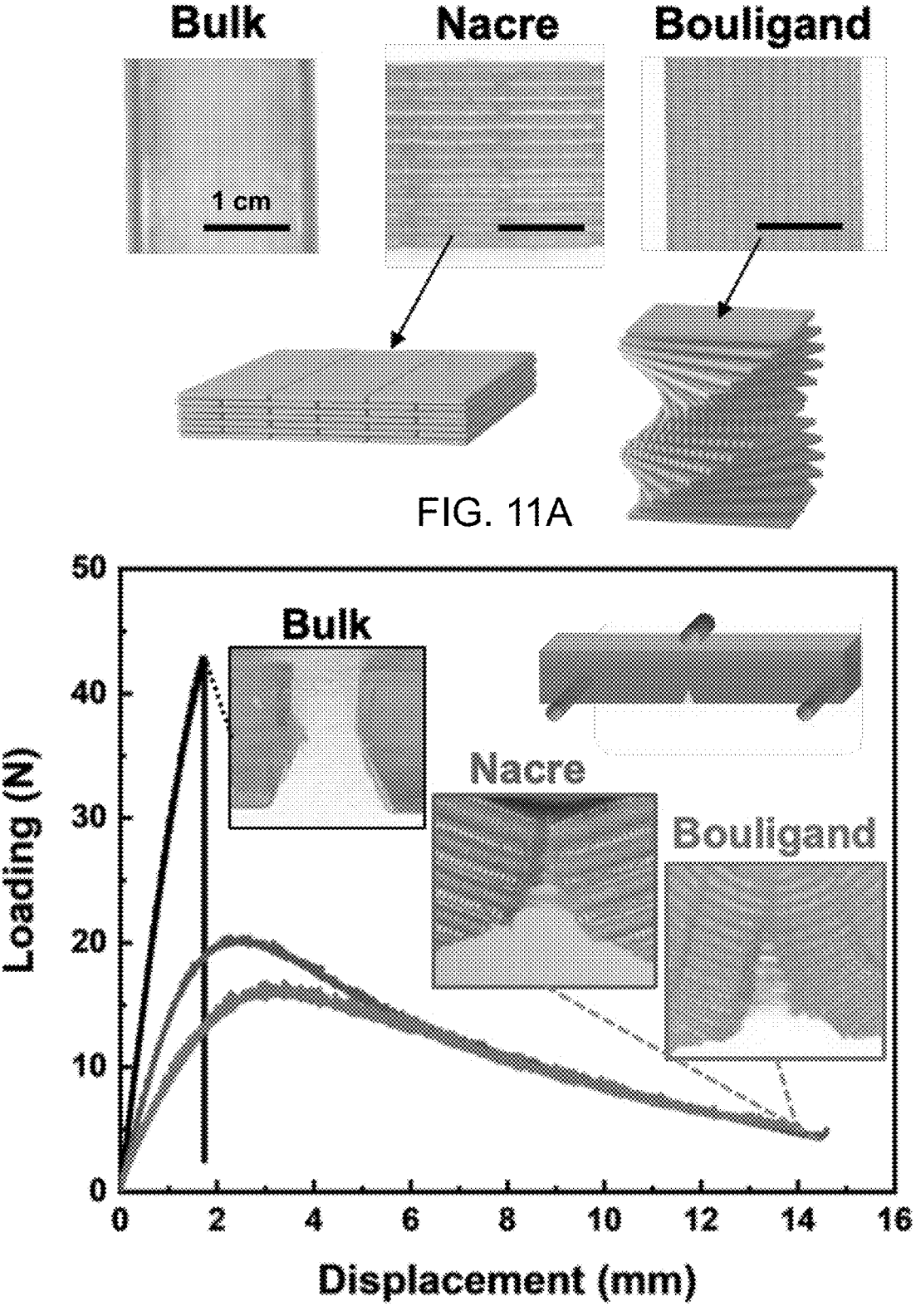
FIG. 11A is a series of photographs of three biomimetic structures manufactured via g-DLP 3D printing using a resin according to the teachings of the present disclosure.
FIG. 11B is a plot of load versus displacement for the three biomimetic structures in FIG. 11A.

Referring to FIGS. 11A-11B, designed biomimetic structures with complex multi-material architectures are shown. Particularly, a Nacre structure, a Bouligand structure, and a bulk or simple structure manufactured with the g-DLP 3D printer using the resin 150 are shown in FIG. 11A, and load as a function of displacement for fracture toughness testing of the three structures is shown in FIG. 11B. The Nacre and Bouligand structures have stiff flakes or fibers that are held or joined together with G70 soft interfaces that elongate a crack propagation pathway and dissipate energy. Specific parameters of the structures like flake/fiber size, aspect ratio or detailed arrangement of the two phases etc. can be tuned to modulate or optimize the toughness of the printed composites.

Referring particularly to FIG. 11B, 3-point bending results of the printed biomimetic structures are shown. The Nacre structure had dimensions of 48 mm (L) by 6 mm (W) by 6 mm (t) and 51% G70 soft material and the Bouligand structure had dimensions of 56 mm (L) by 6 mm (W) by 6 mm (t) and 48% G70 soft material (G70). The three-point bending apparatus had a span of 32 mm, and the fracture toughness for the Nacre structure and the Bouligand structure was 166 Kpa $m^{0.5}$ and 146 Kpa $m^{0.5}$, respectively, compared to a fracture toughness of 42 Kpa $m^{0.5}$ for the G0 bulk cured sample. Accordingly, the Nacre and Bouligand structures exhibited a fracture toughness of about 3 to 4 times greater than the G0 cured bulk sample and g-DLP 3D printing of the resin 150 demonstrates the capability for concept proofing various biomimetic structures.

Referring to FIGS. 12-15, g-DLP 3D printing of the resin 150 to form complex inflatable structures is shown. Inflation is a desirable property in many applications, however, a design space is often limited by the use of only one material and using multiple materials to achieve complex inflations via 3D printing typically requires multiple material reservoirs or even a combination of printing technologies. In contrast, the resin 150 provides for stiff inclusions to be added anywhere in a soft, stretchable matrix using single resin vat, which in turn provides a wide array of possible inflatable designs that cannot be easily achieved using other technologies.

Referring to FIGS. 12A-12B, photographs of a real puffer fish before and after inflation are shown in FIG. 12A and photographs of a biomimetic pufferfish manufactured with the g-DLP 3D printer using the resin 150 are shown in FIG. 12B. The dotted black line in FIG. 12B represents a material transition region with material above the dotted line printed with a G0 grayscale and material below the dotted line printed with a G60 grayscale. And when an interior of the biomimetic pufferfish was subjected to an internal pressure of kPa, the rigid body (upper portion) of the biomimetic pufferfish exhibited a small expansion while the soft belly (lower portion) of the biomimetic pufferfish expanded about times its initial volume and thereby mimicked behavior of a real pufferfish.

Referring to FIGS. 13A-13D, photographs and FEA simulations of four patterned membrane structures manufactured with the g-DLP 3D printer using the resin 150 are shown. Each design had a shallow rigid cylinder with a rigid cap on the bottom and a soft membrane on top. FIG. 13A shows no rigid pattern added to the soft membrane and represents a default inflation case that is typically the limit of single-material inflatable membranes. FIG. 13B shows a design with a single stiff ring embedded in the soft membrane. Internal pressure caused inflation of the soft material between the edge of the cylinder and the outer radius of the stiff ring, which made the stiff ring pop up. The stiff ring itself did not deform due to its much higher modulus. At the inside of the stiff ring was another section of soft membrane, which also popped up due to the internal pressure. FIG. 13C shows a design with four thin concentric stiff rings. These stiff rings constrained the outward expansion of the soft membrane but did not prevent the expansion of the soft membrane upward. This caused the final deformation to be more conical in stark contrast to the plain soft membrane shown in FIG. 13A that took on a spherical shape. FIG. 13D shows a design with four concentric one-third stiff circles printed on the soft membrane. The left side of the soft membrane shown in FIG. 13D with stiff fibers caused the soft membrane to have a generally linear shape, while the right side of the soft membrane was free to take on a spherical shape and thereby lead to an asymmetric inflation. The inflation experiments agreed well with FEA simulations and although only four designs are shown in FIGS. 13A-13D, it should be understood that other inflatable membrane manipulations can be easily achieved using the resin 150.

Figure 14B:
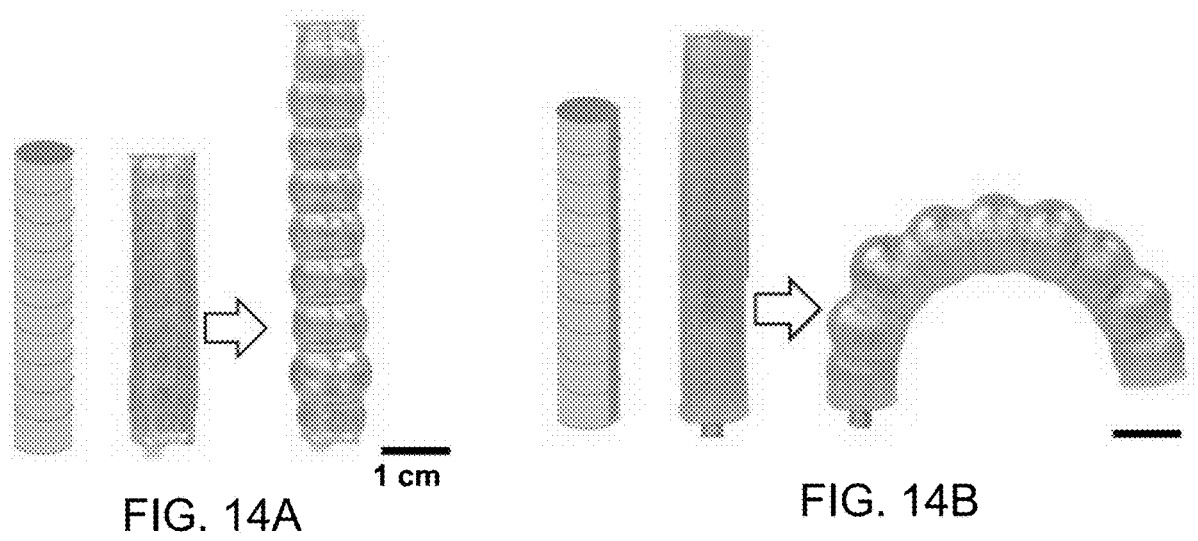
FIG. 14B is a schematic drawing of a cylindrical membrane structure with horizontally oriented stiff rings and a vertically oriented stiff fiber, a photograph of a cylindrical membrane structure with horizontally oriented stiff rings and a vertically oriented stiff fiber manufactured with a g-DLP 3D printer using a resin according to the teachings of the present disclosure before inflation, and a photograph of the cylindrical membrane structure with the horizontally oriented stiff rings and the vertically oriented stiff fiber after inflation.

Referring to FIGS. 14A-14D, four different designs with G0 stiff fibers embedded in a G60 stretchable airtight cylinder matrix are shown. The four designs achieve four basic motions as a result of an applied internal pressure of 30 kPa: extension, torsion, contraction, and bending. Stacking sequences and combinations of these basic motions in a monolithic g-DLP 3D printed soft actuator (using the resin 150) can provide sophisticated deformation. FIG. 14A shows the extension design with G0 stiff rings placed along a length of a G60 soft tube. Without the G0 stiff rings, the G60 soft tube would experience primarily outward deformation when inflated, but the thin G0 stiff rings prevent the outward expansion. And because the G0 stiff rings are not connected, the actuator is much more compliant in the longitudinal direction, which caused its length to increase significantly under pressure. FIG. 14B is a modification of the extension design with G0 stiff rings placed along a length of a G60 soft tube, thereby causing an extension of the actuator. However, adding a single G0 stiff fiber on one side of the G60 soft tube placed an asymmetric constraint on the actuator, causing a bending motion.

Figure 14C:
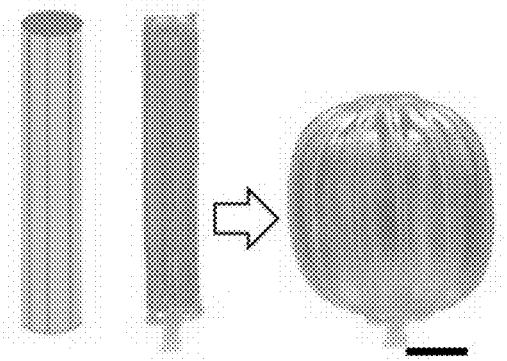
FIG. 14C is a schematic drawing of a cylindrical membrane structure with vertically oriented stiff fibers, a photograph of a cylindrical membrane structure with vertically oriented stiff fibers manufactured with a g-DLP 3D printer using a resin according to the teachings of the present disclosure before inflation, and a photograph of the cylindrical membrane structure with the vertically oriented stiff fibers after inflation.

FIG. 14C presents the retraction design with G0 stiff fibers extending straight between two G0 end caps. Under pressure, the G0 stiff fibers bent outward but resisted a change in length. This caused the two G0 end caps to be pulled closer together by the bending G0 stiff fibers as shown in the figure.

Figure 14D:
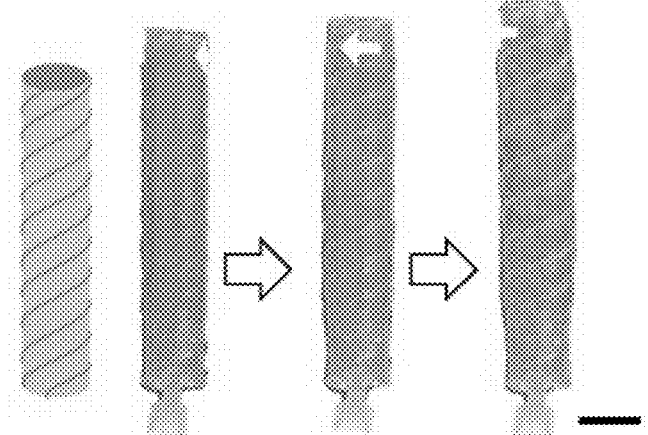
FIG. 14D is a schematic drawing of a cylindrical membrane structure with helical stiff rings, a photograph of a cylindrical membrane structure with helical stiff rings manufactured with a g-DLP 3D printer using a resin according to the teachings of the present disclosure before inflation, and a photograph of the cylindrical membrane structure with helical stiff rings after inflation.

FIG. 14D shows the torsion design which had two helical G0 stiff rings (fibers) that spiraled between the top and bottom of a G60 soft tube. Again, the G0 stiff rings constrained the outward radial expansion of the G60 soft tube and vertical extension was achieved by unwinding of the spiral structures. And the "unwinding" of the spiral structures caused the torsion design actuator to twist, as shown by the attached arrow. It should be understood that combinations of these actuator designs can be used for complex applications such as soft robotics and biomimicry.

Referring to FIG. 15A-15D, a tentacle-like actuator exhibiting bending and twisting is shown. Upon inflation of the actuator shown in FIG. 15A, the actuator gradually wraps into two circles as designed and shown in FIG. 15B, and thus imitates a tentacle grabbing motion. In FIG. 15C, the actuator (weighing 5 g) is shown grasping a marker (weighing 8.5 g) and in FIG. 15D the actuator is shown grasping a plastic centrifuge tube weighing 14 g, thereby functioning much like an elephant trunk. Compared to previous designs of grippers, which typically require two or three fingers, the actuator or gripper enabled by resin 150 allows or provides a simpler design. And it should be understood that the fiber orientation and density can be easily changed to modify the tentacle's inflated shape and motion.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure and are not intended to limit the disclosure of the technology or any aspect thereof. The recitation of multiple forms or variations having stated features is not intended to exclude other forms or variations having additional features, or other forms or variations incorporating different combinations of the stated features.

As used herein the terms "about" and "generally" when related to numerical values herein refer to known commercial and/or experimental measurement variations or tolerances for the referenced quantity. In some variations, such known commercial and/or experimental measurement tolerances are +/−10% of the measured value, while in other variations such known commercial and/or experimental measurement tolerances are +/−5% of the measured value, while in still other variations such known commercial and/or experimental measurement tolerances are +/−2.5% of the measured value. And in at least one variation, such known commercial and/or experimental measurement tolerances are +/−1% of the measured value.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that a form or variation can or may comprise certain elements or features does not exclude other forms or variations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with a form or variation is included in at least one form or variation. The appearances of the phrase "in one variation" or "in one form" (or variations thereof) are not necessarily referring to the same form or variation. It should be also understood that the various method steps discussed herein do not have to be carried out in the same order as depicted, and not each method step is required in each form or variation.

The foregoing description of the forms or variations has been provided for purposes of illustration and description. It is not intended to be exhaustive or to limit the disclosure. Individual elements or features of a particular form or variation are generally not limited to that particular form or variation, but, where applicable, are interchangeable and can be used in a selected form or variation, even if not specifically shown or described. The same may also be varied in many ways. Such variations should not be regarded as a departure from the disclosure, and all such modifications are intended to be included within the scope of the disclosure.

While particular forms or variations have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A resin comprising:

a donor moiety in the form of an acrylate monomer selected from at least one of 2-hydroxyethyl acrylate, caprolactone acrylate, hydroxypropyl acrylate, 2,3-dihydroxypropyl acrylate, 1,3-dihydroxypropyl acrylate, N-hydroxyethyl acrylamide, and aliphatic urethane-based diacrylate, the donor moiety being between about 10 wt. % to about 30 wt. % of an overall composition of the resin;

an acceptor moiety different than the donor moiety, the acceptor moiety in the form of an acrylate monomer selected from at least one of aliphatic urethane-based diacrylate and 2-hydroxyethyl acrylate, the acceptor moiety being between about 10 wt. % to about 30 wt. % of the overall composition of the resin;

a rigid moiety in the form of an acrylate monomer selected from at least one of isobornyl acrylate, 4-acryloylmorpholine, methyl methacrylate, 2-hydroxyethyl methacrylate, and isobornyl methacrylate;

a photoinitiator; and a photoabsorber, the resin configured to form a solid polymer using grayscale digital light processing 3D printing and having a Young's modulus ranging from 0.1 MPa to 100 MPa.

2. The resin according to claim 1, wherein the acrylate monomer of the donor moiety is the 2-hydroxyethyl acrylate.

3. The resin according to claim 1, wherein the acrylate monomer of the acceptor moiety is the aliphatic urethane-based diacrylate.

4. The resin according to claim 1, wherein the rigid moiety is between about 50 wt. % to about 70 wt. % of an overall composition of the resin.

5. The resin according to claim 4, wherein the acrylate monomer of the rigid moiety is isobornyl acrylate.

6. The resin according to claim 1, wherein the acrylate monomer of the donor moiety is the 2-hydroxyethyl acrylate, the acrylate monomer of the acceptor moiety is the aliphatic urethane-based diacrylate, and the acrylate mono-mer of the rigid moiety is the isobornyl acrylate.

7. A resin comprising:

a donor moiety in the form of an acrylate monomer selected from the group consisting of 2-hydroxyethyl acrylate, caprolactone acrylate, hydroxypropyl acrylate, 2,3-dihydroxypropyl acrylate, 1,3-dihydroxypropyl acrylate, N-hydroxyethyl acrylamide, and aliphatic urethane-based diacrylate, the donor moiety being between about 10 wt. % to about 30 wt. % of an overall composition of the resin;

an acceptor moiety different than the donor moiety and in the form of an acrylate monomer selected from the group consisting of aliphatic urethane-based diacrylate and 2-hydroxyethyl acrylate, the acceptor moiety is between about 10 wt. % to about 30 wt. % of the overall composition of the resin;

a rigid moiety in the form of an acrylate monomer selected from the group consisting of isobornyl acrylate, 4-acryloylmorpholine, methyl methacrylate, 2-hydroxyethyl methacrylate, and isobornyl methacrylate, the rigid moiety is between about 50 wt. % to about 70 wt. % of the overall composition of the resin;

a photoinitiator; and a photoabsorber, the resin configured to form a solid polymer using grayscale digital light processing 3D printing with a Young's modulus ranging from 0.1 MPa to 200 MPa.

8. The resin according to claim 7, wherein the acrylate monomer of the donor moiety is the 2-hydroxyethyl acrylate, the acrylate monomer of the acceptor moiety is the aliphatic urethane-based diacrylate, and the acrylate monomer of the rigid moiety is the isobornyl acrylate.

9. A resin comprising:

a donor moiety comprising 2-hydroxyethyl acrylate, the 2-hydroxyethyl acrylate being between about 15 wt. % to about 25 wt. % of an overall composition of the resin;

an acceptor moiety comprising aliphatic urethane-based diacrylate, the aliphatic urethane-based diacrylate being between about 15 wt. % to about 25 wt. % of the overall composition of the resin;

a rigid moiety comprising isobornyl acrylate, the isobornyl acrylate is between about 55 wt. % to about 65 wt. % of the overall composition of the resin;

a photoinitiator; and a photoabsorber, the resin configured to form a solid polymer using grayscale digital light processing 3D printing with a Young's modulus ranging from 0.1 MPa to 300 MPa.

10. The resin according to claim 1, wherein the acrylate monomer of the donor moiety is the 2-hydroxyethyl acrylate and the acrylate monomer of the acceptor moiety is the aliphatic urethane-based diacrylate.

11. The resin according to claim 1, wherein the acrylate monomer of the acceptor moiety is the aliphatic urethane-based diacrylate and the acrylate monomer of the rigid moiety is isobornyl acrylate.

12. The resin according to claim 1, wherein the acrylate monomer of the donor moiety is the 2-hydroxyethyl acrylate and the acrylate monomer of the rigid moiety is isobornyl acrylate.

13. The resin according to claim 7, wherein the acrylate monomer of the donor moiety is the 2-hydroxyethyl acrylate.

14. The resin according to claim 7, wherein the acrylate monomer of the acceptor moiety is the aliphatic urethane-based diacrylate.

15. The resin according to claim 7, wherein the acrylate monomer of the rigid moiety is isobornyl acrylate.

16. The resin according to claim 7, wherein the acrylate monomer of the donor moiety is the 2-hydroxyethyl acrylate and the acrylate monomer of the acceptor moiety is the aliphatic urethane-based diacrylate.

17. The resin according to claim 7, wherein the acrylate monomer of the acceptor moiety is the aliphatic urethane-based diacrylate and the acrylate monomer of the rigid moiety is isobornyl acrylate.

18. The resin according to claim 7, wherein the acrylate monomer of the donor moiety is the 2-hydroxyethyl acrylate and the acrylate monomer of the rigid moiety is isobornyl acrylate.

* * * * *